(12) United States Patent  
Sridharan (10) Patent No.: US 8,302,162 B1  
(45) Date of Patent: Oct. 30, 2012

(54) BACKUP AND ARCHIVAL OF HOSTED ONLINE CONTENT

(75) Inventor: Srineet Sridharan, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 749 days.

(21) Appl. No.: 12/137,148

(22) Filed: Jun. 11, 2008

(51) Int. Cl.
- *G06F 7/04* (2006.01)
- *G06F 15/16* (2006.01)
- *G06F 17/30* (2006.01)
- *H04L 29/06* (2006.01)

(52) U.S. Cl. .......................................... 726/3; 709/227

(58) Field of Classification Search ............... 726/3, 21, 726/27–30; 713/168–181, 189–194
See application file for complete search history.

(56) References Cited

U.S. PATENT DOCUMENTS

| | | | |
|---|---|---|---|
| 5,584,022 A * | 12/1996 | Kikuchi et al. ................ | 1/1 |
| 6,199,072 B1 * | 3/2001 | Jian et al. ...................... | 1/1 |
| 6,754,827 B1 * | 6/2004 | Cane et al. .................... | 713/193 |
| 7,281,016 B2 * | 10/2007 | Yada ............................. | 1/1 |
| 2001/0042124 A1 * | 11/2001 | Barron .......................... | 709/227 |
| 2006/0013566 A1 * | 1/2006 | Nakamura ..................... | 386/97 |
| 2007/0100913 A1 * | 5/2007 | Sumner et al. ................ | 707/204 |

FOREIGN PATENT DOCUMENTS

JP   P2006-174060   *  6/2006

* cited by examiner

*Primary Examiner* — Kambiz Zand  
*Assistant Examiner* — Dant Shaifer Harriman  
(74) *Attorney, Agent, or Firm* — Campbell Stephenson LLP (57) ABSTRACT

A system and method for the backup and archival of online content. In one embodiment, an archival manager receives user authentication information corresponding to a user account, wherein the user account corresponds to a website hosted by at least one content server, the website enables a user to create and store online content associated with the user account, and the online content associated with the user account is stored on a memory accessible by the at least one content server. The archival manager receives an archival schedule, wherein the archival schedule specifies at least one parameter for archiving the online content. According to the archival schedule, the archival schedule periodically archives the online content to an archive server.

39 Claims, 6 Drawing Sheets

BACKUP AND ARCHIVAL OF HOSTED ONLINE CONTENT

BACKGROUND OF THE INVENTION

1. Technical Field

The present disclosure relates generally to data processing systems.

2. Description of the Related Art

Prior to the advent of the Internet and the World Wide Web (WWW), information was provided largely through major media outlets such as television and print media. In recent years, with the rising popularity of social networking and personal web logs (blogs), individuals can make their opinions heard over the Internet. For example, a user can create a blog about a subject of interest. Periodically, the user will create posts about the subject. The posts can include media such as photos and/or video. Visitors to the user's blog can comment on the posts, which results in a dialog between the user and his or her readers.

Due to storage restrictions, users of social networking and blog sites will eventually reach a storage limit with their accounts. At this time, the user needs to make a choice between the inability to add new content to their site or the loss of some of the online content that is necessary to make room for new content. Also, online hosting services can abruptly close, and the user will end up losing their online content. There is a need for the backup and archival of such online content.

SUMMARY OF THE INVENTION

The present invention includes a system and method for the backup and archival of online content. In one embodiment, an archival manager receives user authentication information corresponding to a user account, wherein the user account corresponds to a website hosted by at least one content server, the website enables a user to create and store online content associated with the user account, and the online content associated with the user account is stored on a memory accessible by the at least one content server. The archival manager receives an archival schedule, wherein the archival schedule specifies at least one parameter for archiving the online content. According to the archival schedule, the archival schedule periodically archives the online content to an archive server. An archiving operation may include the act of providing the user authentication information to the at least one content server to access the user account, and archiving the online content in an archive stored on the archive server, in response to successfully accessing the user account. In one embodiment, the archiving operation not only archives online content that was provided by the user, but also archives related online content that was provided by other users. For example, the archiving operation may archive online comments left by other users to online content posted by the user.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
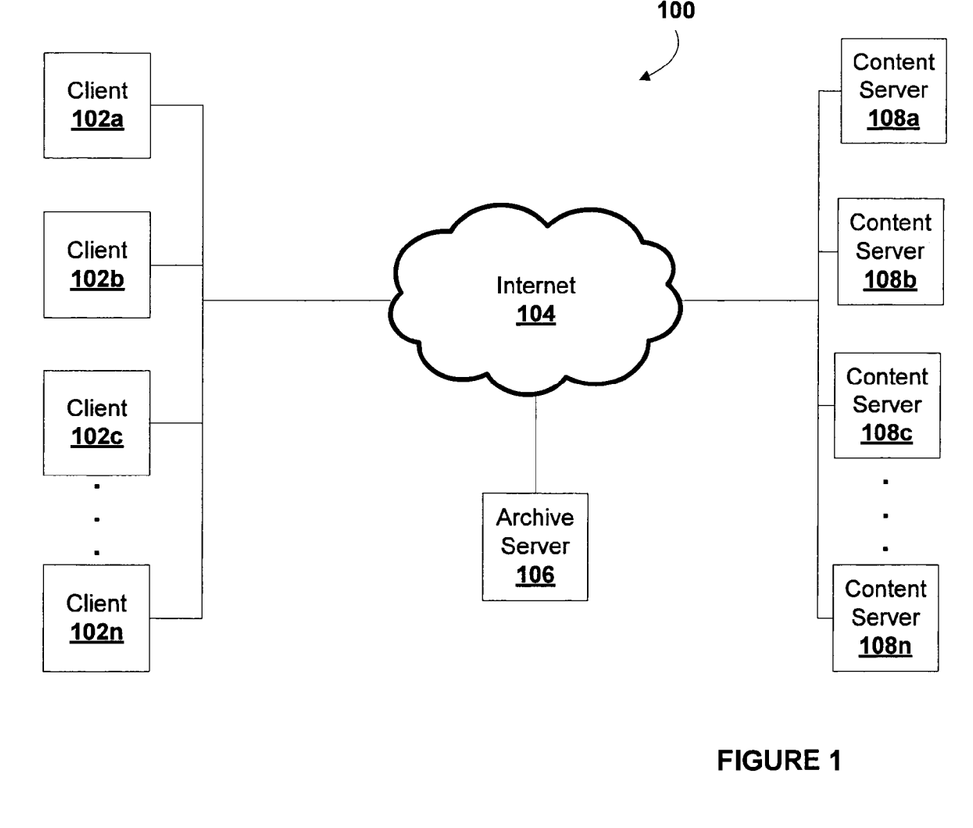
FIG. 1 illustrates an example network in which an embodiment of the present invention may be implemented.
Figure 2A:
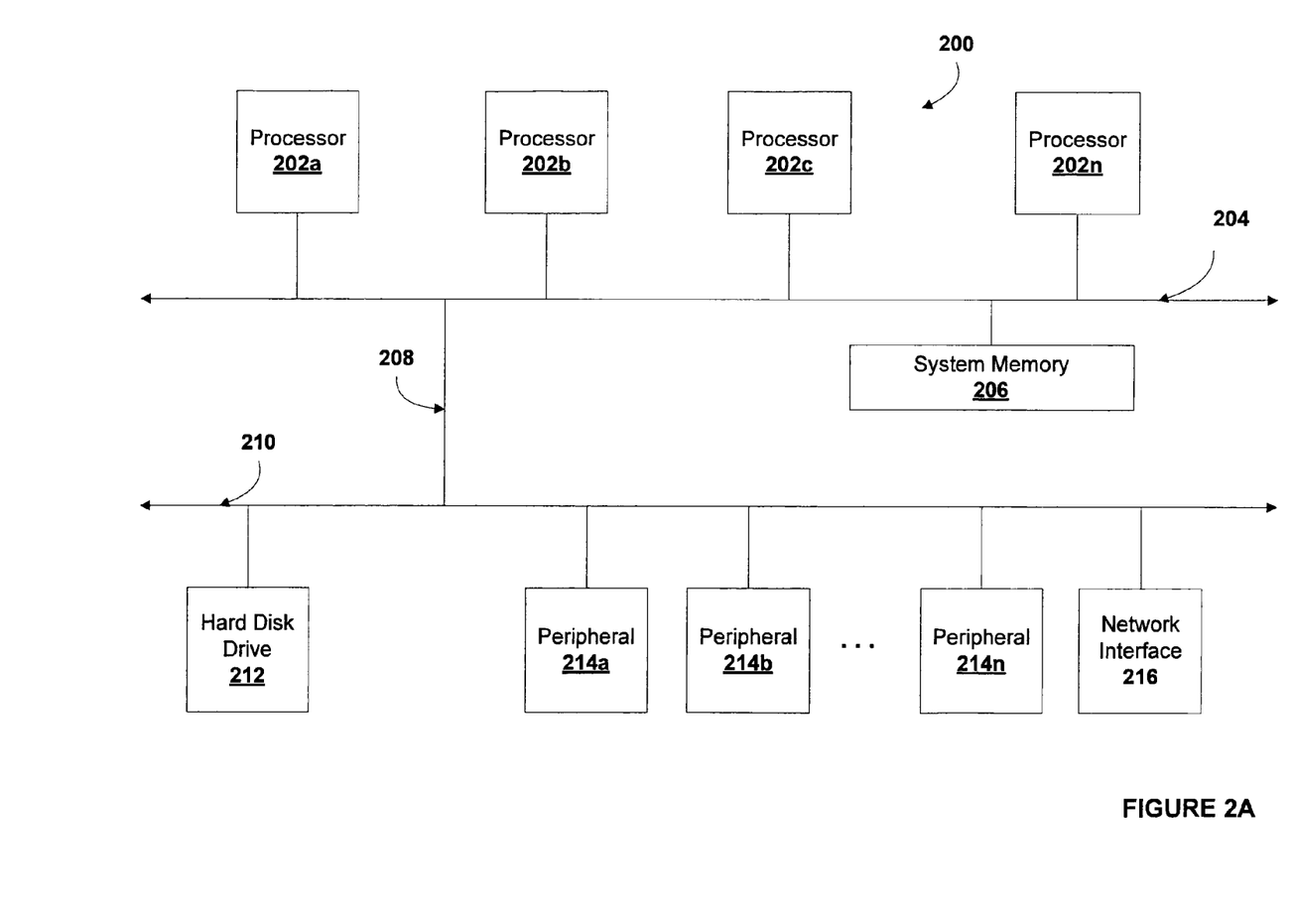
FIG. 2A depicts an example data processing system employed in the network of FIG. 1.
Figure 2B:
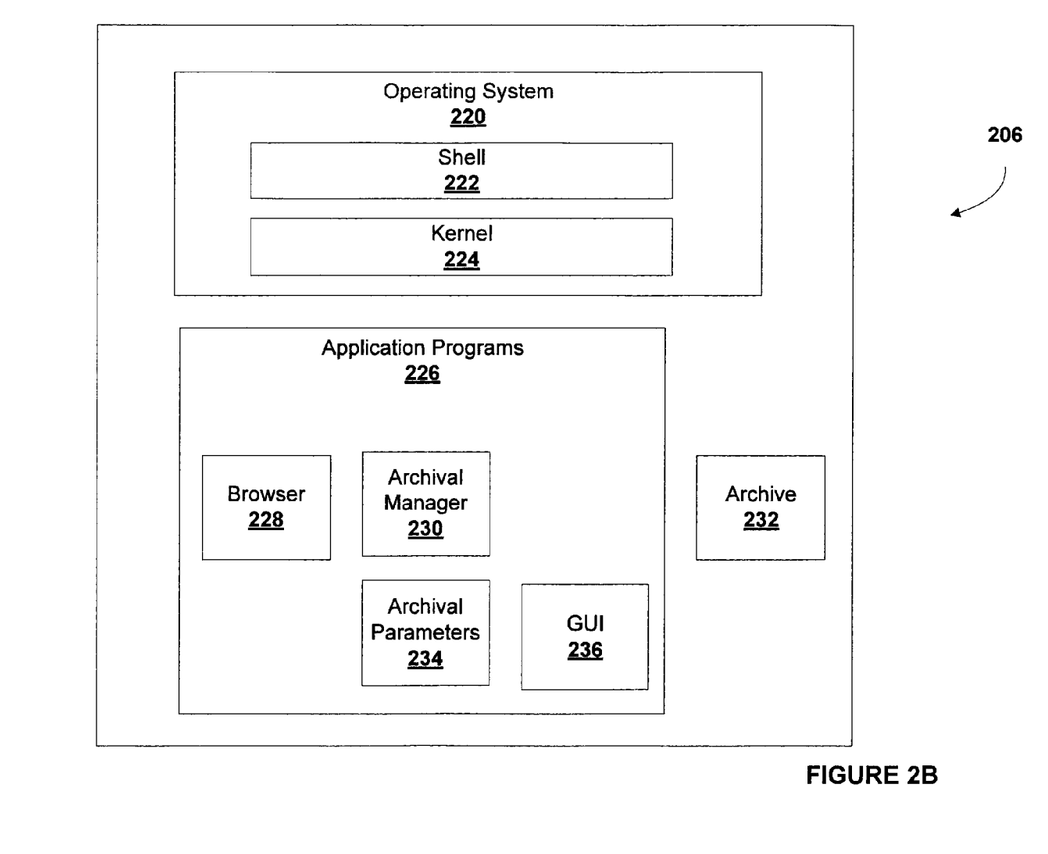
FIG. 2B illustrates contents of an example memory in which an embodiment of the present invention may be implemented.

Referring now to the figures, and in particular, referring to FIG. 1, there is illustrated a block diagram depicting relevant components of an example network 100 in which an embodiment of the present invention may be implemented. As depicted, network 100 includes a collection of clients 102a-102n, Internet 104, and server 106. Clients 102a-102n are coupled to archive server 106 via Internet 104. While Internet 104 is utilized to couple clients 102a-102n to archive server 106, those with skill in the art will appreciate that a local-area network (LAN) or wide-area network (WAN) utilizing Ethernet, IEEE 802.11x, or any other communications protocol may be utilized. Clients 102a-102n and archive server 106 are discussed herein in more detail in conjunction with FIG. 2. Also coupled to Internet 104 are content servers 108a-108n, which host online content such as webpages, media content such as, for example, audio and/or video files, and other types of online content.

According to an embodiment of the present invention, the online content may include user accounts on websites that include user-generated content such as, but not limited to, MySpace®, Facebook®, Flickr®, Blogger®, Twitter®, YouTube®, and the like. The online content may include content generated by the owner of the user account (e.g., blog posts, etc.) or content generated by others (e.g., comments to a user's blog post, photos, etc.). Also, the online content may include online content natively created on the remote website (e.g., blog posts, personal pages on social networking websites, etc.) or online content uploaded by a user (e.g., photos, videos from the user's own camera, etc.).

Those with skill in the art will appreciate that example network 100 may include other components such as routers, firewalls, etc. that are not germane to the discussion of the present network and will not be discussed further herein. Those with skill in the art will also appreciate that the functions of the archive server 106 may be implemented as a server on a network such as Internet 104, but may also be implemented as a stand-alone product stored locally on a client computer. Archive server 106 preferably provides protection and management of the online content. The protection and management of online content includes (but is not limited to) backup, archival/migration, content indexing, and analysis.

FIG. 2A is a block diagram depicting relevant components of an example data processing system 200, which may be utilized to implement any of clients 102a-102n and server 106 as shown in FIG. 1. As illustrated, example data processing system 200 includes a collection of processors 202a-202n that are coupled to a system memory 206 via a system bus 204. System memory 206 may be implemented by dynamic random access memory (DRAM) modules or any other type of random access memory (RAM) module. Mezzanine bus 208 couples system bus 204 to peripheral bus 210. Coupled to peripheral bus 210 is a hard disk drive 212 for mass storage and a collection of peripherals 214a-214n, which may include, but are not limited to, optical drives, other hard disk drives, printers, and input devices, and the like. Network interface 216 enables data processing system 200 to communicate on a network, such as, but not limited to Internet 104.

Included in system memory 206 is operating system 220 (see FIG. 2B), which further includes a shell 222 (as it is called in the UNIX® operating system. UNIX® is a registered trademark of The Open Group in the United States and other countries), for providing transparent user access to resources such as application programs 226. Generally, shell 222, also called a command processor in Microsoft® Windows® operating system, is generally the highest level of the operating system software hierarchy and serves as a command interpreter. Microsoft® and Windows® are trademarks of Microsoft Corporation in the United States, other countries, or both. Shell 222 provides a system prompt, interprets commands entered by keyboard, mouse, or other input media, and sends the interpreted commands) to the appropriate lower levels of the operating system (e.g., kernel 224) for processing. Note that while shell 222 is a text-based, line-oriented user interface, the present invention will support other user interface modes, such as graphical, voice, gestural, etc. equally well.

As illustrated, operating system 220 also includes kernel 224 which includes lower levels of functionality for operating system 220 and application programs 226, including memory management, process and task management, disk management, and mouse and keyboard management. Application programs 226 can include browser 228, utilized for access to Internet 104 (FIG. 1), word processors, spreadsheets, and other application programs. System memory 206 also includes an archival manager 230, archive 232, archival parameters 234, and graphical user interface (GUI) 236 for archival manager 230.

As discussed herein in more detail, archival manager 230 enables a user to archive online content on content servers 108a-108n according to a schedule defined within archival parameters 234. Archival manager 230 may also include a framework (e.g., including, but not limited to a software development kit, etc.) and/or an interface specification for content sites to provide user content for backup. For example, a popular content site may utilize the framework to develop a specialized interface between the content site and archival manager 230 to facilitate custom backup and/or archival functions. For the purposes of this disclosure, "archiving" could mean downloading and recording data associated with a user account on a website for preservation purposes. Those with skill in the art will appreciate that that archival manager 230 downloads data from websites utilizing, for example, but not limited to Hypertext Transfer Protocol (HTTP) and/or Really Simple Syndication (RSS 2.0).

A user provides user-authentication information to enable archival manager 230 to connect to and access user accounts stored on content servers 108a-108n. Example types of user-authentication information include, but are not limited to: usernames, passwords, challenge question answers, Completely Automated Public Turing test to tell Computers and Humans Apart (CAPTCHA®) responses, and the like. Archival parameters 234 include (but are not limited to): a frequency in which archival manager 230 archives the online content (e.g., hourly, daily, weekly, etc.); what type of online content to archive (e.g., blog posts, photos, videos, visitor comments, etc.); a time period in which archival manager 230 deletes online content from the user accounts on content servers 108a-108n to free space for new content, if the user accounts have a storage quota; and whether or not the user desires for the particular media to be encrypted. Those with skill in the art will appreciate that archival manager 230, by referencing archival parameters 234, may also take action on the online content on the source website for the online content. For example, archival manager 230 may delete online content from the source website to free storage capacity (i.e., perform "last wills" on online content) if the remaining storage capacity was approaching, meeting, or exceeding a storage quota limit. Those with skill in the art will also appreciate that archival parameters 232 may include such criteria for last-wills such as, but not limited to, "delete data older than 6 months" or "delete data if the storage capacity exceeds 75% of the storage capacity quota and stop deleting data if the storage capacity is below 50% of the storage capacity quota".

Also, those with skill in the art will appreciate that archival parameters 234 may include a backup parameter that dictates whether to and when to perform incremental backups. The incremental backup operations may copy only that data that has changed or has been newly added to the source website since the last archive operation. Those with skill in the art will also appreciate that if the user chooses to encrypt the online content, the user may provide an encryption passphrase to encrypt the online content before storing the online content in archive 232.

Figure 3A:
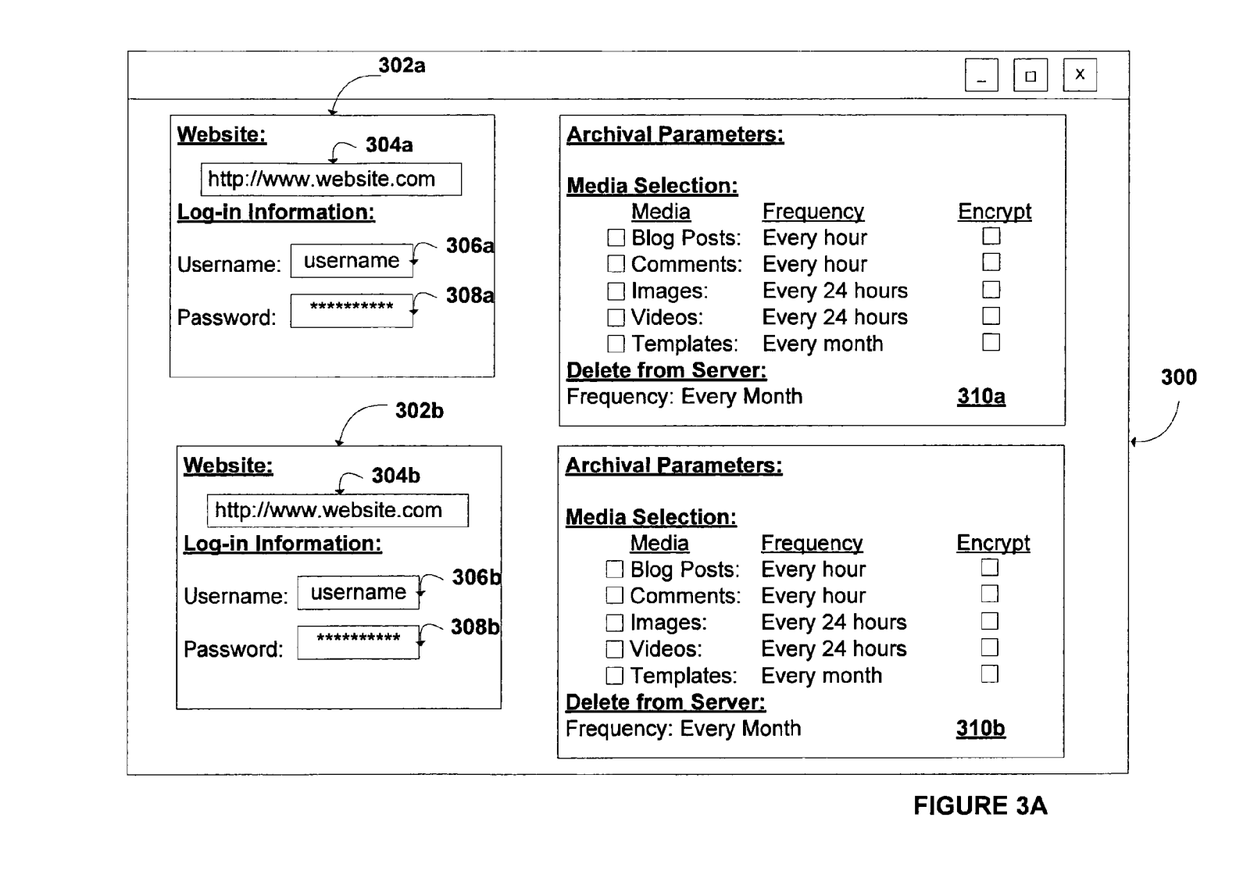
FIG. 3A illustrates an example graphical user interface (GUI) to the archival manager depicted in FIG. 2B.

FIG. 3A is a pictorial representation of a website data entry screen 300 presented by GUI 236 for archival manager 230, in accordance with an embodiment of the present invention. Those with skill in the art will appreciate that website data entry screen 300 may be transmitted by server 106 and presented on a client 102. As discussed herein in more detail, using website identification sections 302a-302b, a user may provide archival manager 230 with website uniform resource locater (URL) information for a website that includes online content to be archived in URL field 304a-304b, log-in information for the website in username field 306a-306b and password field 308a-308b. Those with skill in the art will appreciate that GUI 236 is not limited to two website identification sections, but may include any number of website identification sections. Those with skill in the art will appreciate that website data entry screen 300 may also include a section for enabling users to create an account managed by archival manager 230. This account creation section may also enable a user to specify a username and/or password to access archival manager 230 to search and/or browse content (as shown in browse data field 358 in FIG. 3B) stored in archive 232 or edit archival parameters 234.

As depicted, website identification sections 302a-302b include associated archival parameters sections 310a-310b that enable a user to customize what kind of content is to be archived (e.g., blog posts, comments, images, videos, templates, etc.), the frequency in which the particular media is archived (e.g., each time updated, hourly, every 12 hours, daily, weekly, monthly, etc.), and whether or not the media is to be encrypted for security purposes. Those with skill in the art will appreciate that any type of encryption scheme may be utilized including, but not limited to the Rijdael or Advanced Encryption Standard (AES), the Rivest, Shamir, and Aldeman (RSA) algorithm, or any other type of encryption algorithm.

Figure 3B:
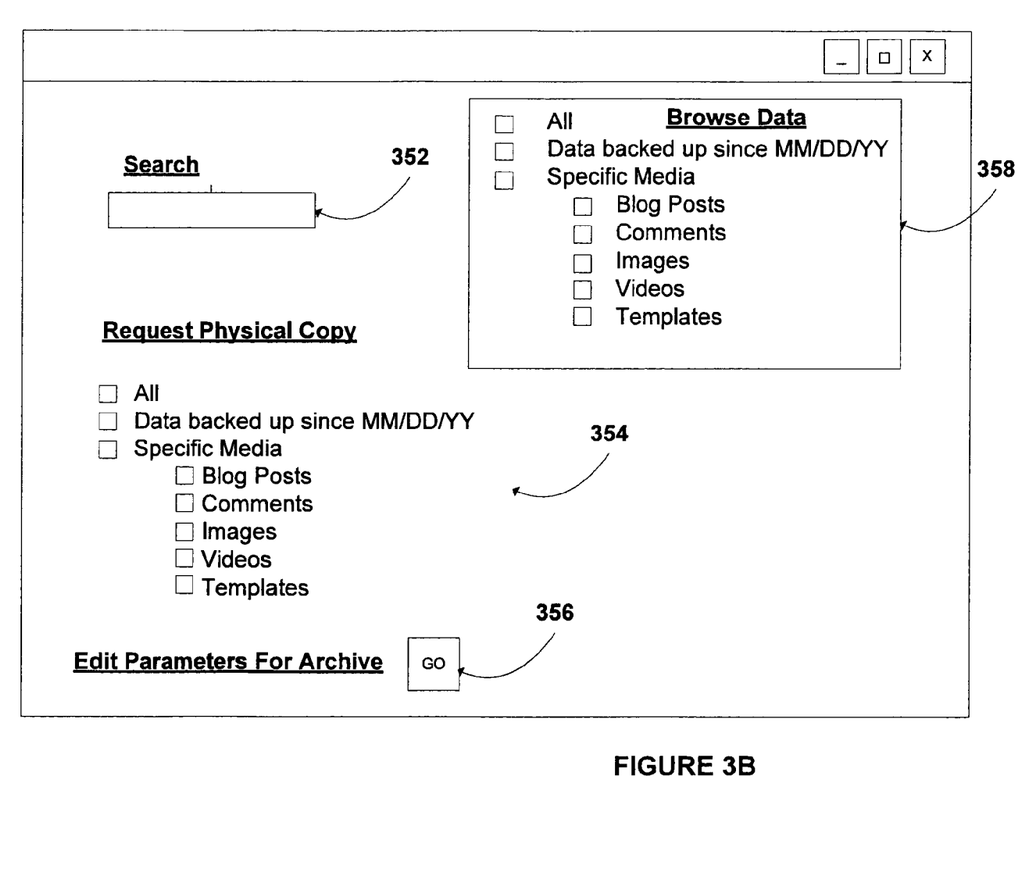
FIG. 3B illustrates an example GUI to the archival manager depicted in FIG. 2B.

FIG. 3B is a pictorial representation of a website data entry screen 350 presented by GUI 236 for archival manager 230 in accordance with one embodiment of the present invention. Those with skill in the art will appreciate that website data entry screen 300 may be transmitted by server 106 and presented on a client 102. Website data entry screen 350 includes search field 352 that enables a user to enter search terms to enable a user to search within the data archive stored in archive 232. Selection boxes 354 enables a user to request a physical copy (e.g., a CD-ROM, DVD-ROM, etc.) of the data archive stored in archive 232. The user can also specify how much of the data archive to be included in the physical copy (e.g., all, data backed up since a specified date, or the specific type of media such as image, video, blog posts, comments, or the like). Parameter edit section 356 enable the user to edit the parameters for archiving, which would prompt the GUI 236 to display the website data entry screen 300 depicted in FIG. 3A.

Figure 4:
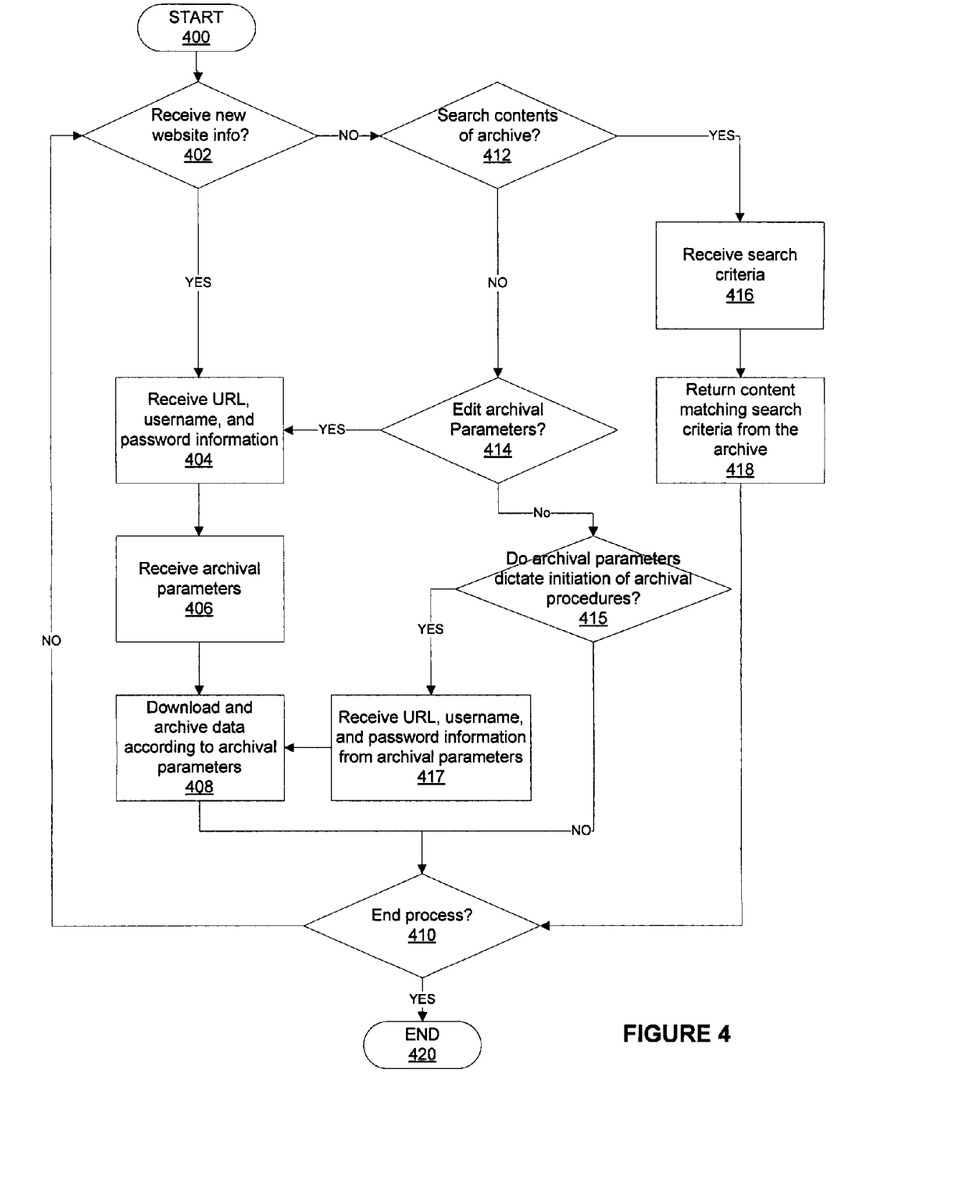
FIG. 4 illustrates an example method for implementing backup and archival of hosted online content according to an embodiment of the present invention.

FIG. 4 is a high-level logical flowchart illustrating an example method for implementing backup and archival of hosted online content according to an embodiment of the present invention. The process begins at step 400, and proceeds to step 402, which illustrates archival manager 230 determining if it has received new website information designating a new website from which to archive hosted online content. If so, the process continues to step 404, which illustrates archival manager 230 receiving URL, username, and password information corresponding to a new website from which to archive hosted online content, as illustrated in website identification sections 302a-302b. The process continues to step 406, which depicts archival manager 230 receiving archival parameters via archival parameters section 310a-310b and saving the archival parameters in archival parameters 234. The process proceeds to step 408, which illustrates archival manager 230 downloading and archiving hosted online content according to the parameters specified in archival parameters 234. The hosted online content is archived in archive 232, as illustrated in FIG. 2B. The process continues to step 410, which illustrates archival manager 230 determining if the process should end. For example, the process can end by a user-supplied command, archival manager 230 determining that there are no more websites from which hosted online content is to be archived. If so, the process ends, as depicted in step 420. If not, the process returns to step 402.

Returning to step 402, if archival manager 230 has not received new website information, the process continues to step 412, which illustrates archival manager 230 determining if a user wants to search for specific content saved in archive 232. If so, the process continues to step 416, which illustrates archival manager 230 receiving search criteria. The process continues to step 418, which depicts archival manager 230 returning a collection of search results based on data stored in archive 232, in response to receiving search criteria. The process continues to step 410.

Returning to step 414, if archival manager 230 determines that the user desires to edit the archival parameters saved in archival parameters 234, the process continues to step 404. If not, the process continues to step 415, which illustrates archival manager 230 determining if archival parameters 234 dictate the initiation of archival procedures. For example, if the user had previously indicated in archival parameters 234 that online content from a specific website should be saved in archive 232 on a periodic bases (e.g., daily, weekly, monthly, when new content appears, etc.), such setting within archival parameters 234 would require archival manager 230 to initiate archival procedures. If archival manager 230 determines that archival parameters 234 dictate the initiation of archival procedures, the process continues to step 408. If not, the process continues to step 410.

The present invention may also be implemented as a method of doing business that involves an online service to which customers (e.g., individuals, organizations, any other entity, etc.) can register, where the service provided is to backup and archive content related to that customer on different websites. The information on those websites and means to authenticate to those websites are provided by the customers to the service, along with other parameters such as, but not limited to, the schedule for backup and/or archive, encryption options, and options related to what related to content to backup and/or archive. Additionally, the service may allow the customer to browse and search for backed-up and/or archived content related to the customers and download and/or otherwise retrieve the content or selected parts of the content on demand, or to backup and/or archive content or selected parts of the content on physical media such as, but not limited to, optical disks (e.g., CD-ROM, DVDs, etc.).

As discussed herein, the present invention includes a system and method for the backup and archival of online content. In one embodiment, an archival manager receives user authentication information corresponding to a user account, wherein the user account corresponds to a website hosted by at least one content server, the website enables a user to create and store online content associated with the user account, and the online content associated with the user account is stored on a memory accessible by the at least one content server. The archival manager receives an archival schedule, wherein the archival schedule specifies at least one parameter for archiving the online content. According to the archival schedule, the archival schedule periodically archives the online content to an archive server. An archiving operation may include the act of providing the user authentication information to the at least one content server to access the user account, and archiving the online content in an archive stored on the archive server, in response to successfully accessing the user account.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
 receiving user authentication information corresponding to a user account, wherein
  said user account corresponds to a website hosted by at least one content server,
  said website enables a user to create or store online content associated with said user account,
  said website further enables another user to create or store additional online content related to said online content, and
  said online content and said additional online content are stored on a memory accessible by said at least one content server;
 receiving an archival schedule, wherein said archival schedule comprises a frequency in which to archive said online content and said additional online content, said frequency ensures said online content and said additional online content are archived before said online content and said additional online content are deleted from said memory, said deletion of said online content and said additional online content from said memory is performed due to storage restrictions associated with said user account, and said archival schedule is received at an archive server; and according to said archival schedule, periodically archiving said online content and said additional online content to an archive by:

using said user authentication information to access said user account, in response to successfully accessing said user account, archiving said online content and said additional online content in said archive, and said archive is stored on said archive server.

2. The method according to claim 1, wherein said archiving further comprises:

creating a local archive of said online content and said additional online content.

3. The method according to claim 1, further comprising:

upon request, providing a copy of said online content and said additional online content on a physical storage medium.

4. The method according to claim 3, wherein said physical storage medium is an optical disk.

5. The method according to claim 1, further comprising:

encrypting said online content and said additional online content.

6. The method according to claim 5, wherein said encrypting further comprises:

providing an encryption passphrase; and encrypting said online content and said additional online content utilizing said encryption passphrase before storing said online content and said additional online content into said archive.

7. The method according to claim 1, further comprising:

browsing for specific content among said archive.

8. The method according to claim 1, further comprising:

searching for specific content among said archive.

9. The method according to claim 1, further comprising:

requiring a second set of user authentication information before said archiving said online content and said additional online content.

10. The method according to claim 1, further comprising:

accessing said archive on a server via the Internet.

11. A system, comprising:

at least one processor;

an interconnect, coupled to said at least one processor; and a non-transitory computer-readable storage medium, coupled to said at least one processor via said interconnect, wherein said non-transitory computer-readable storage medium comprises instructions executable by said at least one processor and configured for:

receiving user authentication corresponding to a user account, wherein said user account corresponds to a website hosted by at least one content server, said website enables a user to create or store online content associated with said user account, said website further enables another user to create or store additional online content related to said online content, and said online content and said additional online content are stored on a memory accessible by said at least one content server;

receiving an archival schedule, wherein said archival schedule comprises a frequency in which to archive said online content and said additional online content, said frequency ensures said online content and said additional online content are archived before said online content and said additional online content are deleted from said memory, said deletion of said online content and said additional online content from said memory is performed due to storage restrictions associated with said user account, and said archival schedule is received at an archive server; and according to said archival schedule, periodically archiving said online content and said additional online content to an archive by:

using said user authentication information to access said user account, in response to successfully accessing said user account, archiving said online content and said additional online content in said archive, and said archive is stored on said archive server.

12. The system according to claim 11, wherein said instructions for archiving further comprise:

instructions for creating a local archive of said online content and said additional online content.

13. The system according to claim 11, wherein said instructions further comprise:

instructions for providing a copy of said online content and said additional online content on a physical storage medium, upon request.

14. The system according to claim 13, wherein said physical storage medium is an optical disk.

15. The system according to claim 11, wherein said instructions further comprise:

instructions for encrypting said online content and said additional online content.

16. The system according to claim 15, wherein said instructions for encrypting further comprise:

instructions for providing an encryption passphrase; and instructions for encrypting said online content and said additional online content utilizing said encryption passphrase before storing said online content and said additional online content into said archive.

17. The system according to claim 11, wherein said instructions further comprise:

instructions for browsing for specific content among said archive.

18. The system according to claim 11, wherein said instructions further comprise:

instructions for searching for specific content among said archive.

19. The system according to claim 11, wherein said instructions further comprise:

instructions for requiring a second set of user authentication information before said archiving said online content and said additional online content.

20. The system according to claim 11, wherein said instructions further comprise: instructions for accessing said archive on a server via the Internet.

21. The system according to claim 11, wherein said instructions further comprise:
  instructions for searching for specific content among said archive.

22. A non-transitory computer-readable storage medium comprising computer program code, when executed by a processor, generates instructions configured for:
  receiving user authentication information corresponding to a user account, wherein
    said user account corresponds to a website hosted by at least one content server,
    said website enables a user to create or store online content associated with said user account,
    said website further enables another user to create or store additional online content related to said online content, and
    said online content and said additional online content are stored on a memory accessible by said at least one content server;
  receiving an archival schedule, wherein
    said archival schedule comprises a frequency in which to archive said online content and said additional online content,
    said frequency ensures said online content and said additional online content are archived before said online content and said additional online content are deleted from said memory,
    said deletion of said online content and said additional online content from said memory is performed due to storage restrictions associated with said user account, and
    said archival schedule is received at an archive server; and
  according to said archival schedule, periodically archiving said online content and said additional online content to an archive by:
    using said user authentication information to access said user account,
    in response to successfully accessing said user account, archiving said online content and said additional online content in said archive, and
    said archive is stored on said archive server.

23. The non-transitory computer-readable storage medium according to claim 22, wherein said instructions for archiving further comprise:
  instructions for creating a local archive of said online content and said additional online content.

24. The non-transitory computer-readable storage medium according to claim 22, wherein said instructions further comprise:
  instructions for providing a copy of said online content and said additional online content on a physical storage medium, upon request.

25. The non-transitory computer-readable storage medium according to claim 24, wherein said physical storage medium is an optical disk.

26. The non-transitory computer-readable storage medium according to claim 22, wherein said instructions further comprise:
  instructions for encrypting said online content and said additional online content.

27. The non-transitory computer-readable storage medium according to claim 26, wherein said instructions for encrypting further comprise:
  instructions for providing an encryption passphrase; and
  instructions for encrypting said online content and said additional online content utilizing said encryption passphrase before storing said online content and said additional online content into said archive.

28. The non-transitory computer-readable storage medium according to claim 22, wherein said instructions further comprise:
  instructions for browsing for specific content among said archive.

29. The non-transitory computer-readable storage medium according to claim 22, wherein said instructions further comprise:
  instructions for searching for specific content among said archive.

30. The non-transitory computer-readable storage medium according to claim 22, wherein said instructions further comprise:
  instructions for requiring a second set of user authentication information before said archiving said online content and said additional online content.

31. The non-transitory computer-readable storage medium according to claim 22, wherein said instructions further comprise:
  instructions for accessing said archive on a server via the Internet.

32. The non-transitory computer-readable storage medium according to claim 22, wherein said instructions further comprise:
  instructions for searching for specific content among said archive.

33. The method of claim 1, wherein said archival schedule further comprises a time period in which said online content and said additional online content are deleted from said at least one content server, if said user account has a storage quota.

34. The method of claim 1, further comprising:
  receiving second user authentication information corresponding to a second user account, wherein
    said second user account corresponds to a second website hosted by a second content server,
    said second website enables said user to create or store second online content associated with said second user account, and
    said second online content associated with said second user account is stored on a second memory accessible by said second content server;
  receiving a second archival schedule, wherein
    said second archival schedule comprises a second frequency in which to archive said second online content,
    said second frequency of said second archival schedule ensures said second online content is archived before said second online content is deleted from said second memory,
    said deletion of said second online content from said second memory is performed due to storage restrictions associated with said second user account, and
    said second archival schedule is received at the archive server; and
  according to the second archival schedule, periodically archiving said second online content to said archive by:
    using said second user authentication information to access said second user account, and
    in response to successfully accessing said second user account, archiving said second online content in said archive.

35. The method of claim 1, further comprising:
  receiving second user authentication information corresponding to a second user account, wherein said second user account corresponds to a second website hosted by said at least one content server,
said second website enables a second user to create or store second online content associated with said second user account, and
said second online content associated with said second user account is stored on the memory accessible by said at least one content server;
receiving a second archival schedule, wherein
said second archival schedule comprises a second frequency in which to archive said second online content,
said second frequency of said second archival schedule ensures said second online content is archived before said second online content is deleted from said memory,
said deletion of said second online content from said memory is performed due to storage restrictions associated with said second user account, and
said second archival schedule is received at the archive server; and
according to the second archival schedule, periodically archiving said second online content to said archive by:
using said second user authentication information to access said second user account, and
in response to successfully accessing said second user account, archiving said second online content in said archive.

36. The system of claim 11, wherein said instructions further comprise:
instructions for receiving second user authentication information corresponding to a second user account, wherein
said second user account corresponds to a second website hosted by a second content server,
said second website enables said user to create or store second online content associated with said second user account, and
said second online content associated with said second user account is stored on a second memory accessible by said second content server;
instructions for receiving a second archival schedule, wherein
said second archival schedule comprises a second frequency in which to archive said second online content,
said second frequency of said second archival schedule ensures said second online content is archived before said second online content is deleted from said second memory,
said deletion of said second online content from said second memory is performed due to storage restrictions associated with said second user account, and
said second archival schedule is received at the archive server; and
instructions for, according to the second archival schedule, periodically archiving said second online content to said archive by:
using said second user authentication information to access said second user account, and
in response to successfully accessing said second user account, archiving said second online content in said archive.

37. The system of claim 11, wherein said instructions further comprise:
instructions for receiving second user authentication information corresponding to a second user account, wherein
said second user account corresponds to a second website hosted by said at least one content server,
said second website enables a second user to create or store second online content associated with said second user account, and
said second online content associated with said second user account is stored on the memory accessible by said at least one content server;
instructions for receiving a second archival schedule, wherein
said second archival schedule comprises a second frequency in which to archive said second online content,
said second frequency of said second archival schedule ensures said second online content is archived before said second online content is deleted from said memory,
said deletion of said second online content from said memory is performed due to storage restrictions associated with said second user account, and
said second archival schedule is received at the archive server; and
instructions for, according to the second archival schedule, periodically archiving said second online content to said archive by:
using said second user authentication information to access said second user account, and
in response to successfully accessing said second user account, archiving said second online content in said archive.

38. The non-transitory computer-readable storage medium according to claim 22, wherein said instructions further comprise:
instructions for receiving second user authentication information corresponding to a second user account, wherein
said second user account corresponds to a second website hosted by a second content server,
said second website enables said user to create or store second online content associated with said second user account, and
said second online content associated with said second user account is stored on a second memory accessible by said second content server;
instructions for receiving a second archival schedule, wherein
said second archival schedule comprises a second frequency in which to archive said second online content,
said second frequency of said second archival schedule ensures said second online content is archived before said second online content is deleted from said second memory,
said deletion of said second online content from said second memory is performed due to storage restrictions associated with said second user account, and
said second archival schedule is received at the archive server; and
instructions for, according to the second archival schedule, periodically archiving said second online content to said archive by:
using said second user authentication information to access said second user account, and
in response to successfully accessing said second user account, archiving said second online content in said archive.

39. The non-transitory computer-readable storage medium according to claim 22, wherein said instructions further comprise:
- instructions for receiving second user authentication information corresponding to a second user account, wherein
    - said second user account corresponds to a second website hosted by said at least one content server,
    - said second website enables a second user to create or store second online content associated with said second user account, and
    - said second online content associated with said second user account is stored on the memory accessible by said at least one content server;
- instructions for receiving a second archival schedule, wherein
    - said second archival schedule comprises a second frequency in which to archive said second online content,
    - said second frequency of said second archival schedule ensures said second online content is archived before said second online content is deleted from said memory,
    - said deletion of said second online content from said memory is performed due to storage restrictions associated with said second user account, and
    - said second archival schedule is received at the archive server; and
- instructions for, according to the second archival schedule, periodically archiving said second online content to said archive by:
    - using said second user authentication information to access said second user account, and
    - in response to successfully accessing said second user account, archiving said second online content in said archive.

* * * * *